United States Patent [19]

Zirngibl

[11] Patent Number: 5,155,780
[45] Date of Patent: Oct. 13, 1992

[54] OPTICAL LIMITING AMPLIFIER

[75] Inventor: Martin Zirngibl, Middletown, N.J.

[73] Assignee: AT&T Bell Laboratories, Murray Hill, N.J.

[21] Appl. No.: 825,900

[22] Filed: Jan. 27, 1992

[51] Int. Cl.$^5$ ............................................... G02B 6/26
[52] U.S. Cl. ........................................ 385/27; 385/42; 372/6
[58] Field of Search ...................... 385/27, 30, 42, 141, 385/142; 372/6

[56] References Cited

U.S. PATENT DOCUMENTS

| | | | |
|---|---|---|---|
| 4,674,830 | 6/1987 | Shaw et al. | 385/30 |
| 4,723,824 | 2/1988 | Shaw et al. | 385/39 |
| 4,778,237 | 10/1988 | Sorin et al. | 385/30 |
| 5,050,949 | 9/1991 | DiGiovanni et al. | 385/24 |
| 5,058,974 | 10/1991 | Mollenauer | 385/27 |

OTHER PUBLICATIONS

"High Gain Limiting Erbium-Doped Fibre Amplifier With Over 30 dB Dynamic Range", W. I. Way et al., Electronics Letters, vol. 27, No. 3, Jan. 31, 1991, pp. 211-213.

Primary Examiner—Frank Gonzalez
Attorney, Agent, or Firm—E. Weiss

[57] ABSTRACT

This invention relates to an optical limiting amplifier which provides an optical output signal of substantially constant power for an optical input signal of varying power which is simple to construct and economical to build. In this invention, an optical signal whose power can fluctuate over a wide range is split into two signals. The first signal is applied to an optical fiber amplifier in the forward feed direction. The second signal is passed through a saturable absorber and then applied to the optical fiber amplifier in the backward feed direction. The signal from the saturable absorber varies at a rate which is greater than the rate that the signal to the saturable absorber varies. Thus, as the signal to the saturable absorber increases, the signal from the saturable absorber will increase at a greater rate; and, as the signal to the saturable absorber decreases, the signal from the saturable absorber will decrease at a greater rate. The backward feed signal effects the gain saturation of the optical fiber amplifier in such a way as to cause the output power of the optical fiber amplifier to be constant regardless of variations to the input signal power.

11 Claims, 4 Drawing Sheets

OPTICAL LIMITING AMPLIFIER

TECHNICAL FIELD

This invention relates to optical amplifiers and more particularly to an optical limiting amplifier which provides substantially constant output power over a wide range of input power variations.

BACKGROUND OF THE INVENTION

Initial efforts in optical communications were concentrated in the transmission arena where optical fiber was used as a high bandwidth transmission medium in an otherwise electronic matrix. Electrical signals representative of intelligence were transformed into optical signals for transmission along an optical fiber and, at the receiving end, were transformed back into electrical signals for further processing. It was realized, however, that the cost of installing and operating the optical systems could be minimized if the signals could also be processed in optical form instead of only being transmitted in optical form. Accordingly, techniques for switching and processing optical signals are being developed. Among the first areas into which optical communications is moving, beyond transmission, is the field of optical amplification and regeneration.

In particular, optical amplifiers using erbium-doped optical fibers have recently become commercially available. These amplifying fibers can be coupled end-to-end to a transmission fiber and transversely coupled through a directional coupler to a laser diode pump. Such optical amplifiers exhibit low noise, relatively large polarization independent bandwidth, reduced cross talk and low insertion loss. In addition, they are relatively cheap to fabricate.

In optical transmission systems and networks, signal power levels may vary significantly due to variations in transmission path lengths and uncontrollable splitting and splicing losses. These variations of signal power can cause serious problems at an optical receiver whose design is normally optimized for a single signal power level.

A device for providing an optical signal having a relatively constant output power for optical input signals of varying power is disclosed in Electronics Letters, Jan. 31, 1981, Vol. 27, No. 3, pages 211-213, entitled "High Gain Limiting Erbium Doped Fiber Amplifiers With Over 30 dB Dynamic Range" by W. J. Way et al. The device disclosed is a optical limiting amplifier which has three separate stages of erbium doped optical fiber amplifiers positioned in tandem. Each stage of the assemblage must be separately pumped and filters are required between the various stages. This requirement of three separately pumped stages makes the device relatively expensive to fabricate.

A need exists for a more economical optical limiting amplifier that sets the output signal power to a predefined value for input signal powers of various values.

SUMMARY OF THE INVENTION

This invention relates to an optical limiting amplifier which provides an optical output signal of substantially constant power for an optical input signal of varying power which is simple to construct and economical to build. In this invention, an optical signal whose power can fluctuate over a wide range is split into two signals. The first signal is applied to an optical fiber amplifier in the forward feed direction. The second signal is passed through a saturable absorber and then applied to the optical fiber amplifier in the backward feed direction. The signal from the saturable absorber varies at a rate which is greater than the rate that the signal to the saturable absorber varies. Thus, as the signal to the saturable absorber increases, the signal from the saturable absorber will increase at a greater rate; and, as the signal to the saturable absorber decreases, the signal from the saturable absorber will decrease at a greater rate. The backward feed signal effects the gain saturation of the optical fiber amplifier in such a way as to cause the output power of the optical fiber amplifier to be constant regardless of variations to the input signal power.

DETAILED DESCRIPTION

This invention relates to optical limiting amplifiers which can be used in optical transmission systems, optical switching networks and the like such as, for example, a subscriber loop or a long haul transmission system to generate a constant power optical output signal from a received optical signal whose power cna vary as a result of splice losses, power varations due to unequal length of transmission fibers and/or generators of optical signals having different power levels.

In this invention, the received optical signal is split into a forward feed signal and a backward feed signal. The forward feed signal is injected into the optical fiber amplifier to propagate from the input port to the output port of the fiber amplifier. The backward feed signal is injected into the optical fiber amplifier to propagate from the output port to the input port of the optical fiber amplifier. In operation, an increase of power of the received optical signal results in an increase of the forward feed signal and an increase of the backward feed signal. But, the backward feed signal increases faster than the forward feed signal due to the bleaching of the loss. The backward feed signal increases the gain saturation of the optical amplifier and, therefore, reduces the gain of the optical amplifier. The result is that the higher power forward feed signal is amplified at reduced gain. In a similar manner, if the received optical signal has a reduction of power, the backward feed signal will be reduced and the gain saturation of the optical amplifier will be reduced. In this instance, the lower power input signal will be amplified with increased gain.

Figure 1:
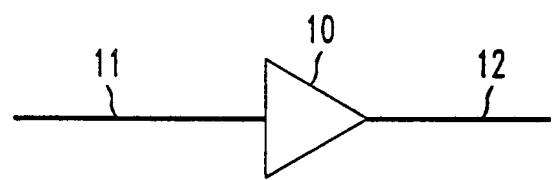
FIG. 1 is a schematic representation of a prior art optical fiber amplifier.
Figure 2:
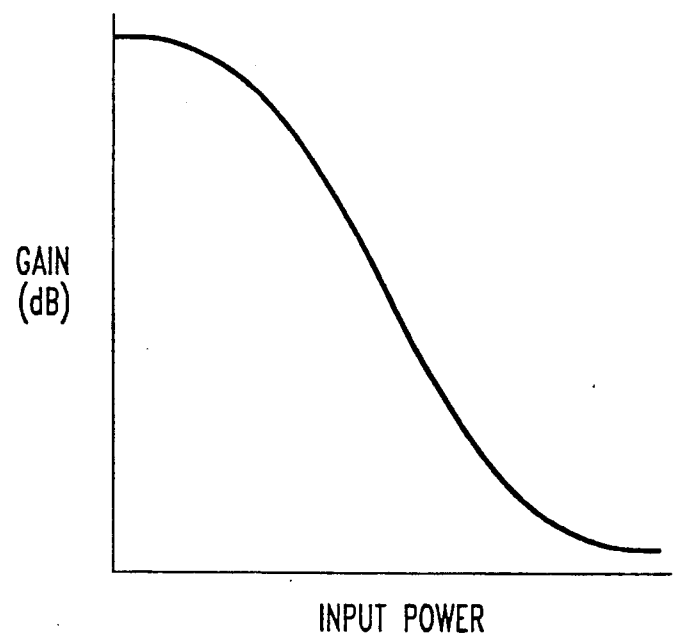
FIG. 2 is a plot of the gain saturation curve of the optical fiber amplifier of FIG. 1.

The principles underlying the invention will be more readily appreciated by first considering both a basic optical fiber amplifier and a gain stablized fiber optical amplifier. In particular, FIG. 1 is a schematic representation of a basic optical fiber amplifier 10. Such amplifiers are now well known in the art and comprise, for example, an erbium doped silica-based optical fiber that acts as a gain medium. When the erbium doped gain medium is appropriately pumped, for example, by optical pumping, the population of states is inverted. Under such circumstances, optical signal energy of appropriate wavelength, when fed into the amplifier by fiber 11, is amplified and exits via fiber 12. However, the gain of the amplifier is not constant with input optical signal power. Rather, as the input power increases, the gain medium saturates and the gain decreases. This is shown schematically in FIG. 2.

Figure 3:
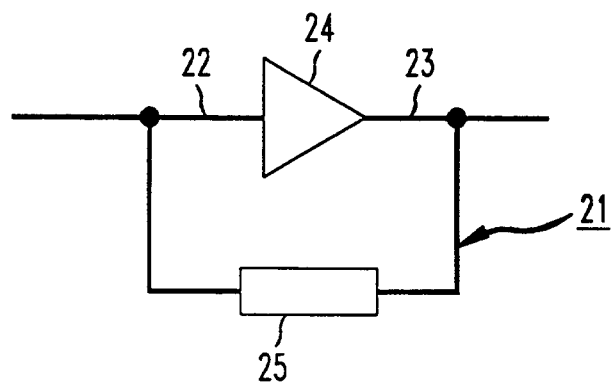
FIG. 3 is a schematic representation of a gain stabilized optical fiber amplifier.
Figure 4:
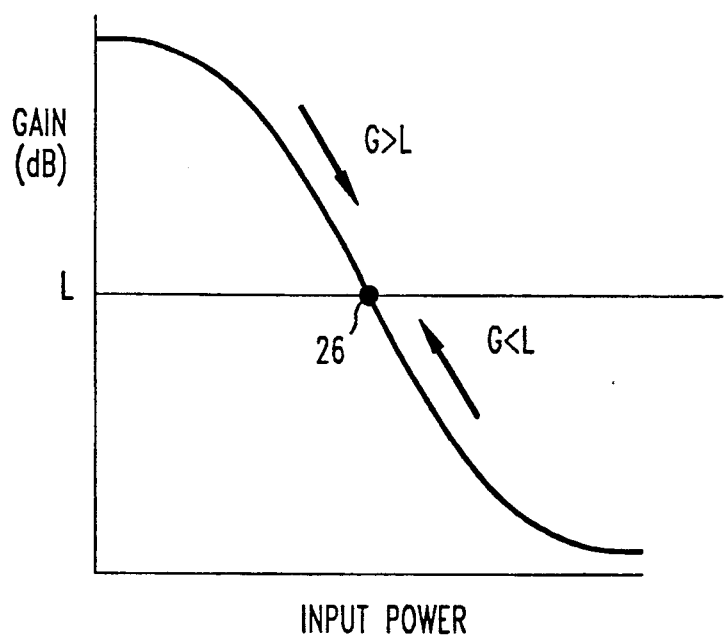
FIG. 4 is a plot of the gain saturation curve of the gain stabilized optical fiber amplifier of FIG. 3.

An all optical technique for stabilizing the gain characteristics of fiber optical amplifiers is disclosed in M. Zirngibl, Electronics Letters, Vol. 27, No. 7, page 560, Mar. 28, 1991. The technique is shown schematically in FIG. 3 and involves the use of an optical feedback loop 21 between the output port 23 and the input port 22 of the optical fiber amplifier 24. A material 25 that displays loss at relevant wavelengths is inserted in the feedback loop. Some of the output power at specific wavelengths is directed through the feedback loop. Referring now to FIG. 4, there is illustrated a plot of the gain saturation curve of the gain stablized optical fiber amplifier of FIG. 3. If the loss "L" of medium 25 is greater than the gain "G" of the amplifier 24, i.e., $G<L$, then the amplifier will not be able compensate for the loss and the power in the feedback loop will decrease. Accordingly, and as illustrated by the upward arrow in FIG. 4, when the power in the feedback loop decreases, the gain will increase. If, on the other hand the loss associated with medium 25 were to be less than the gain, i.e., $G>L$, then the amplifier would more than compensate for the loss in the feedback loop and the power in the feedback loop would increase. As illustrated by the downward arrow in FIG. 4, this increase in power would result in a decrease in gain. This heuristic analysis shows that, if $G<L$, the gain increases and, if $G>L$, the gain decreases. Accordingly, the only stable operating point is when G equals L as denoted at 26. Therefore, the structure of FIG. 3 yields a gain stabilized optical fiber amplifier. It does not provide a stabilized output signal.

Figure 5:
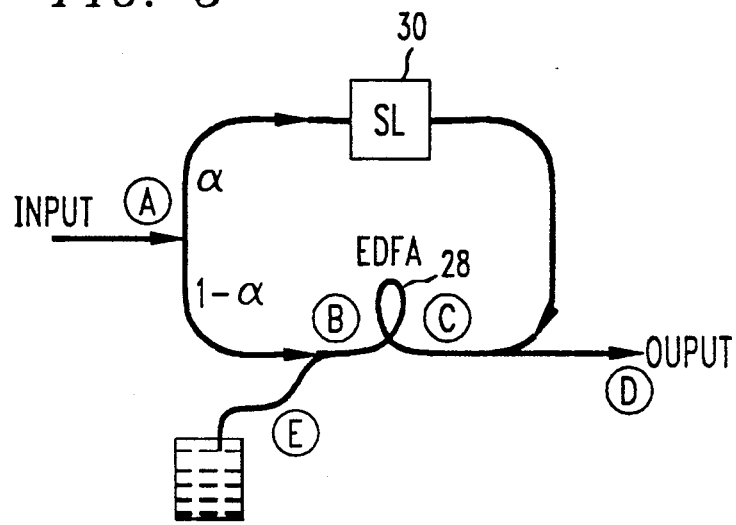
FIG. 5 is a block diagram of structure in accordance with the principles of the invention.

The inventive structure here disclosed is illustrated in FIG. 5. The incoming optical signal is split at input port A into a forward feed optical signal $1-\alpha$ and a backward feed optical signal $\alpha$. The forward feed signal $1-\alpha$ is injected into the input port B of the erbium doped fiber amplifier (EDFA) 28 to pass through the optical fiber amplifier in the forward direction; and the backward feed signal $\alpha$, after being attenuated in saturable loss means 30, is injected into the output port C of the erbium doped optical fiber amplifier 10 to pass through the optical fiber amplifier in the backward feed direction. Only the forward feed signal $1-\alpha$ contributes to the output signal at port D of the optical fiber amplifier. Both the forward feed signal and the backward feed signal causes gain saturation within the optical fiber amplifier. But, the backward feed signal is equal to or larger than the forward feed signal and increases faster due to the saturable loss. Therefore, the gain saturation of the erbium doped optical fiber caused by the backward feed signal can more than compensate for the forward feed signal increase which is proportional to the input power at A.

Figure 6:
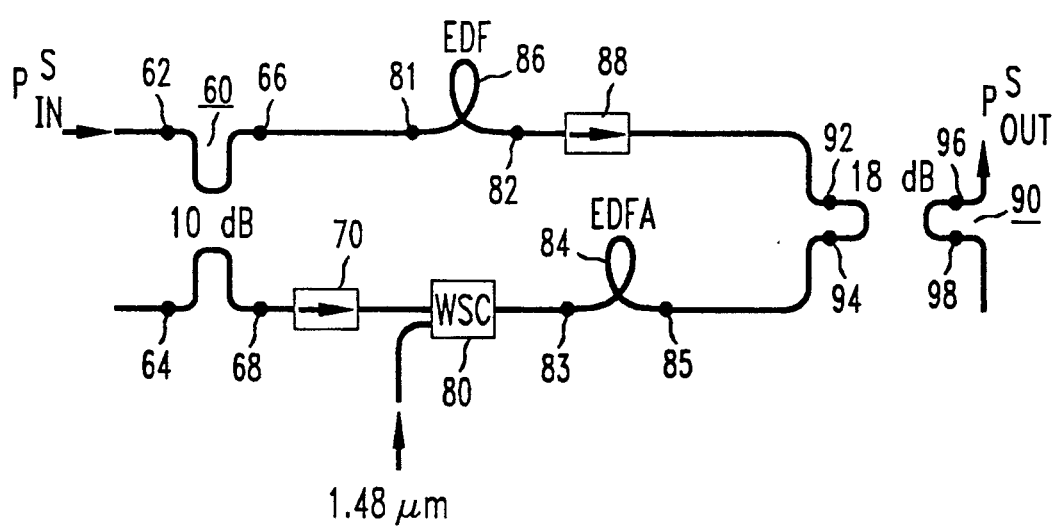
FIG. 6 is a schematic of structure in accordance with the principles of the invention for providing optical power equalization over a broad range of input power using a single optical fiber amplifier; and, FIG. 7 illustrates a plot of input/output power characteristics for a signal having a wavelength of 1.557 $\mu$m without power equalization and with power equalization using the structure of FIG. 6.

Referring to FIG. 6, there is illustrated a schematic of structure in accordance with the principles of the invention. A 10 dB coupler 60 having four ports 62, 64, 66, 68 is coupled to receive an input signal $P_{IN}{}^S$ at port 62. Port 68 is coupled through an optical fiber isolator 70 and a wavelength selective coupler (WSC) 80 to the forward feed port 83 of an erbium doped optical fiber amplifier 84. In the embodiment of FIG. 6, the erbium doped optical fiber amplifier 84 is substantially ten meters long. A pump signal of a wavelength of 1.48 μm is coupled to the forward feed port 83 of the erbium doped fiber amplier via wavelength selective coupler 80.

Port 66 of coupler 60 is coupled to an input port of a saturable loss means 86. In the embodiment of FIG. 6, the saturable loss means comprises a one meter length of umpumped erbium doped fiber (EDF). The output port of the saturable loss means is coupled to an optical fiber isolator 88. A coupler, such as an 18 dB coupler 90 having four ports 92, 94, 96, 98 is coupled, via port 94 to the output port 85 of amplifier 84 and via port 92 to the optical fiber isolator 88. Port 98 of coupler 90 is terminated in a loss medium to prevent energy reflections; and, output port 96 is coupled to an output means such as an optical receiver designated to receive the controlled output signal $P_{OUT}{}^S$.

In operation, the received signal $P_{IN}{}^S$, in this instance, a signal having a wavelength of substantially 1.557 μm is applied to port 62 of the optical fiber coupler 60. The 10 dB coupler 60 divides the received signal into a forward feed signal of substantially 10 percent of the power of the received signal and a backward feed signal of substantially 90 percent of the received signal. The backward feed signal at port 66 is directed to saturable loss means 86. The forward feed signal at port 68 is directed to optical fiber isolator 70. In operation, an increase of signal strength at the input port of saturable loss means 86 will cause a decrease of loss in the saturable loss means. Thus, if it is assumed that the saturable loss means reduces the input signal by 50 percent, then when an increase of input signal occurs, the saturable loss means will reduce the input signal by 45 percent. The signal from the saturable loss means is directed through optical isolator 88 and through the 18 dB coupler 90 to the backward feed port 85 of the erbium doped optical fiber amplifier 84. Because the coupler is an 18 dB optical coupler, substantially all of the signal from the isolator 88 is directed toward the backward feed port 85 of the erbium doped optical fiber amplifier 84. This backward feed signal is the major contributor to the gain saturation of the erbium doped optical fiber amplifier. The backward feed signal advances through the erbium doped optical fiber amplifier 84 and the wavelength selective coupler 80 to the optical fiber isolator 70 where it is substantially completely blocked.

The signal at port 68 of the 10 dB optical coupler splitter is directed through optical fiber isolator 70 and wavelength selective coupler 80 to the forward feed terminal 83 of the erbium doped optical fiber amplifier 84. This forward feed signal passes through the erbium doped optical fiber amplifier, which is gain saturated by the backward feed signal, and passes through the 18 dB coupler 90 to output port 96. In practice, it was determined that the optical coupler 60 can vary from a 3 dB optical coupler which directs 50 percent of the input power to the forward feed port 68 and 50 percent of the input power to the backward feed port 66. Isolator 88 prevents optical energy from the optical amplifier forward output 85 which passes through port 82 of optical coupler 90 from passing through and bleaching saturable loss means 86. Isolator 70 prevents backward optical energy from the erbium doped optical fiber amplifier 84 from reaching optical coupler 60.

In the embodiment illustrated, the saturable loss means was selected to have a small signal unsaturated loss substantially equal to the signal loss of optical coupler 60 which, in this instance, is 10 dB. Thus, in the small signal mode, the signal at backward feed port 85 is substantially equal to the signal at the forward feed port 83 of the erbium doped optical fiber amplifier. The term small signal mode means that the signal does not cause saturation in either the saturable loss means 86 or the erbium doped optical fiber amplifier. Thus, in the signal mode, the power of the optical signal applied to the forward feed terminal 83 is substantially equal to the optical signal applied to the backward feed terminal 85.

Figure 7:
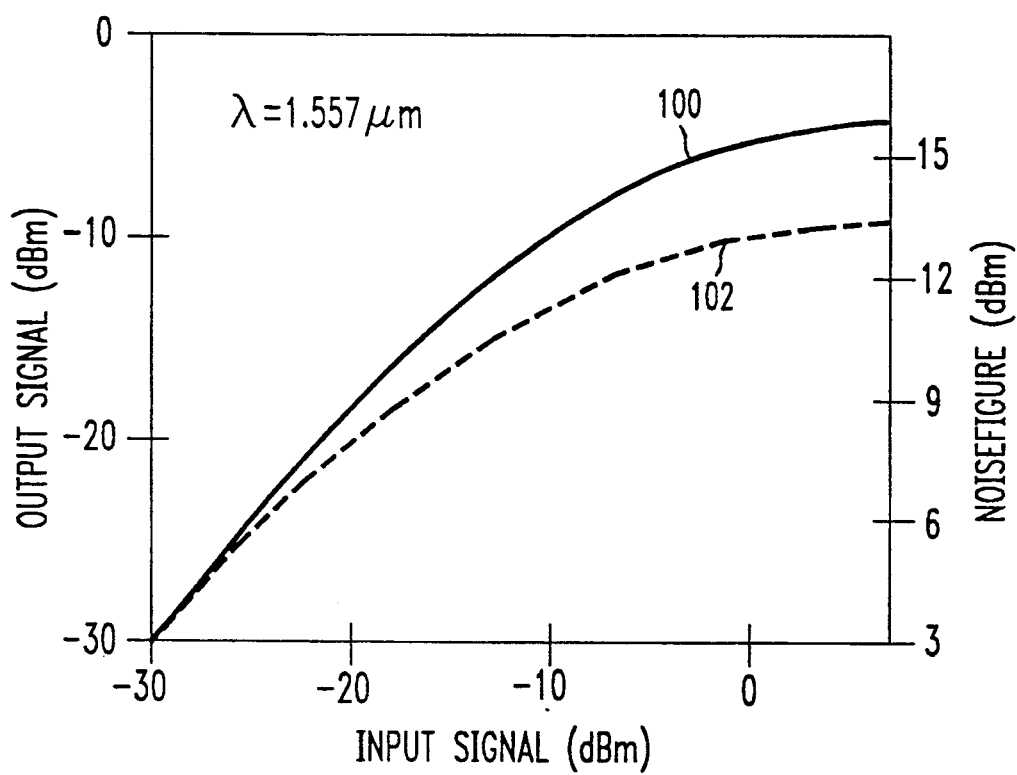

Referring to FIG. 7, there is illustrated a plot of input/output power characteristics for a signal of a wavelength of 1.557 μm. Curve 100 is a plot without output signal power being stabilized and curve 102 is with output signal power being stabilized using the invention illustrated in FIG. 6.

The optical limiting amplifier disclosed provides a relatively high constant output power for a wide range of input power variations with a single optical fiber amplifier. The invention can be designed to exhibit negative, zero and positive differential gain to provide output power leveling over a broad range of input power.

What has been described is merely illustrative of the application of the principles of the present invention. Other arrangements and methods can be implemented by those skilled in the art without departing from the spirit and scope of the present invention.

I claim:

1. A optical limiting amplifier comprising
first coupler means to split a received optical signal into a first optical signal and a second optical signal,
an optical fiber amplifier coupled to receive the first optical signal in a forward feed direction and the second optical signal in a backward feed direction,
a loss means coupled to change the power level of the second optical signal directed to the optical fiber amplifier when a change to said power level of said first signal occurs and at a rate which is faster than that of said first optical signal, and
an output port coupled to receive the first optical signal as it exits from the optical fiber amplifier.

2. The device of claim 1 wherein
said first optical signal has a power level which is less than or equal to that of said second optical signal.

3. The device of claim 2 wherein
said first optical signal has a power level which lies within a range of 10 percent to 50 percent of said received optical signal and said second optical signal has a power level which has with a range of 90 percent to 50 percent of said received optical signal.

4. The device of claim 3 comprising
a first isolator coupled to prevent the second optical signal which exits the optical fiber amplifier from reaching the first coupler means.

5. The device of claim 4 comprising
a second isolator coupled to prevent the first optical signal which exits the optical amplifier from reaching the loss means.

6. The device of claim 5 comprising a second coupler to pass substantially all of the second optical signal from said loss means to the optical fiber amplifier and a reduced portion of the first optical signal from the optical fiber amplifier to an output port.

7. The device of claim 6 wherein said loss means is a saturable loss device.

8. The device of claim 7 wherein said saturable loss device has a small signal unsaturable loss substantially equal to the small signal unsaturable loss of said first coupler means.

9. The device of claim 7 wherein said saturable loss device comprises an unpumped erbium doped optical fiber.

10. The device of claim 9 wherein said optical fiber amplifier comprises an erbium doped optical fiber amplifier.

11. The device of claim 10 wherein said first coupler means is a 10 dB coupler and said second coupler is an 18 dB coupler.

* * * * *